(12) United States Patent
Veda et al.

(10) Patent No.: US 10,797,488 B2
(45) Date of Patent: Oct. 6, 2020

(54) SYSTEMS AND METHODS FOR OPERATIVELY COUPLING A MICRO-GRID TO A BULK GRID

(71) Applicant: General Electric Company, Schenectady, NY (US)

(72) Inventors: Santosh Sambamoorthy Veda, Niskayuna, NY (US); William James Premerlani, Scotia, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 285 days.

(21) Appl. No.: 15/243,974

(22) Filed: Aug. 23, 2016

(65) Prior Publication Data
US 2018/0062394 A1    Mar. 1, 2018

(51) Int. Cl.
*H02J 3/00* (2006.01)
*H02J 3/46* (2006.01)
(Continued)

(52) U.S. Cl.
CPC .................. *H02J 3/46* (2013.01); *H02J 3/04* (2013.01); *H02J 3/42* (2013.01)

(58) Field of Classification Search
USPC .......................................................... 307/84
See application file for complete search history.

(56) References Cited

U.S. PATENT DOCUMENTS 3,440,509 A    4/1969   Tomeo et al.
3,784,896 A    1/1974   Lakota
(Continued)

FOREIGN PATENT DOCUMENTS

CN    102723741 A    10/2012
CN    103795086 A    5/2014
(Continued)

OTHER PUBLICATIONS

S. Hariharan et al., "Asynchronous operation and resynchronisation of synchronous machines", Electrical Engineers, Proceedings of the Institution of, vol. 123, Issue: 11, Nov. 1976, pp. 1225-1233.
(Continued)

*Primary Examiner* — Rexford N Barnie
*Assistant Examiner* — Dru Parries
(74) *Attorney, Agent, or Firm* — Armstrong Teasdale LLP

(57) ABSTRACT

A method for operatively coupling a plurality of generating units in at least one micro-grid to a bulk grid, where the at least one micro-grid is configurable to be operatively coupled to the bulk grid via a point of interconnection breaker is presented. The method includes, using a control unit operatively coupled to the at least one micro-grid and the bulk grid, determining one or more bulk grid side parameters and one or more micro-grid side parameters, comparing one or more of the one or more micro-grid side parameters with corresponding one or more bulk grid side parameters, and synchronizing each of the plurality of generating units in the at least one micro-grid with the bulk grid based on the comparison. Further, the method includes connecting simultaneously, using the point of interconnection breaker, each of the plurality of generating units to the bulk grid based on the synchronization.

14 Claims, 3 Drawing Sheets

(51) Int. Cl.
*H02J 3/42* (2006.01)
*H02J 3/04* (2006.01)

(56) References Cited

U.S. PATENT DOCUMENTS

| | | | |
|---|---|---|---|
| 4,492,874 A * | 1/1985 | Near | H02J 3/42 290/40 B |
| 5,958,060 A | 9/1999 | Premerlani | |
| 6,815,932 B2 | 11/2004 | Wall | |
| 7,183,667 B2 | 2/2007 | Colby et al. | |
| 7,656,060 B2 * | 2/2010 | Algrain | H02J 3/42 307/84 |
| 7,701,087 B2 | 4/2010 | Eckroad et al. | |
| 2009/0108678 A1 | 4/2009 | Algrain | |
| 2014/0103727 A1 | 4/2014 | Taimela et al. | |
| 2015/0295581 A1 | 10/2015 | Shi et al. | |

FOREIGN PATENT DOCUMENTS

| | | |
|---|---|---|
| WO | 2016/023574 A1 | 2/2016 |
| WO | 2017/136828 A1 | 8/2017 |

OTHER PUBLICATIONS

M Hanif et al., "Control and SRR-q based re-synchronization of a master DG for microgids", Power India International Conference (PIICON), 2014 6th IEEE, Dec. 5-7, 2014, Delhi, pp. 1-6.

S D'Arco et al., "A synchronization controller for grid reconnection of islanded virtual synchronous machines", Power Electronics for Distributed Generation Systems (PEDG), 2015 IEEE 6th International Symposium on, Jun. 22-25, 2015, Aachen, pp. 1-8.

Extended European Search Report and Opinion issued in connection with corresponding EP Application No. 17175727.1 dated Jan. 15, 2018.

Cintuglu, M. H., et al., "Frequency and Voltage Control of Microgrids upon Unintentional Cascading Islanding," Proceedings of the IEEE SoutheastCon, pp. 1-6 (Apr. 9-12, 2015).

Shi, D., et al., "Active Synchronization Control for Microgrid Reconnection after Islanding," 5th IEEE PES Innovative Smart Grid Technologies Europe (ISGT Europe), pp. 1-6 (Oct. 12-15, 2014).

Office Action and Search report issued in connection with corresponding SE Application No. 1750731-0 dated Oct. 9, 2018.

* cited by examiner

SYSTEMS AND METHODS FOR OPERATIVELY COUPLING A MICRO-GRID TO A BULK GRID

STATEMENT REGARDING FEDERALLY SPONSORED RESEARCH AND DEVELOPMENT

This invention was made with Government support under grant number DE-OE0000728 awarded by the Government. The Government has certain rights in the invention.

BACKGROUND

Embodiments of the present specification relate generally to a system and method for interconnecting two grids, and more specifically to a system and method for synchronizing and connecting a micro-grid to a bulk grid.

A micro-grid is an electrical network with a well-defined boundary and typically includes generating assets such as small distributed generators, local loads, inverter-based distributed generation and other power systems equipment. Further, the micro-grid is generally coupled to the bulk grid (for example, an area electric power system (AEPS)) through one or more Points of Interconnection (POIs). In certain scenarios that arise from situations such as electrical disturbances, outage of the bulk grid, a request from an AEPS operator, and the like, the micro-grid may operate as an island by severing its link to the bulk grid. In this island mode of operation, frequency and voltage within the micro-grid are generally determined by the operating conditions of the micro-grid itself.

Further, it may be desirable to reconnect the micro-grid to the bulk grid. Currently, while reconnecting the micro-grid to the bulk grid, each of the multiple generating assets of the micro-grid is individually connected back to the bulk grid. Disadvantageously, individually connecting each generating asset of the micro-grid to the bulk grid is a laborious task, since time required and number of intermediate steps for resynchronizing with the bulk grid is greater. Typically, resynchronizing and eventually re-connecting generating assets necessiates use of equipment, such as synchronizing relays. Alternatively, the generating assets need to be equipped with advanced controls for performing the resynchronization and reconnection. In addition, while reconnecting the micro-grid to the bulk grid, it is desirable to take precautions that ensure that reconnecting the micro-grid to the bulk grid by closing a POI breaker does not adversely impact the micro-grid assets.

BRIEF DESCRIPTION

In accordance with aspects of the present specification, a method for operatively coupling a plurality of generating units in at least one micro-grid to a bulk grid, where the at least one micro-grid is configurable to be operatively coupled to the bulk grid at a point of interconnection via a point of interconnection breaker is presented. The method includes determining, using a control unit, one or more bulk grid side parameters and one or more micro-grid side parameters, where the control unit is operatively coupled to the at least one micro-grid and the bulk grid. Further, the method includes comparing, using the control unit, one or more of the one or more micro-grid side parameters with corresponding one or more bulk grid side parameters. The method also includes synchronizing, using the control unit, each of the plurality of generating units in the at least one micro-grid with the bulk grid based on the comparison. Moreover, the method includes connecting simultaneously, using the point of interconnection breaker, each of the plurality of generating units to the bulk grid based on the synchronization. A non-transitory computer readable medium including one or more tangible media, where the one or more tangible media include code adapted to perform the method for operatively coupling a plurality of generating units in at least one micro-grid to a bulk grid, where the at least one micro-grid is configurable to be operatively coupled to the bulk grid at a point of interconnection via a point of interconnection breaker is presented.

In accordance with another aspect of the present specification, a system for operatively coupling a plurality of generating units in at least one micro-grid to a bulk grid is presented. The system includes a point of interconnection breaker disposed between the bulk grid and the at least one micro-grid, where the point of interconnection breaker is configured to operatively couple the at least one micro-grid to the bulk grid at a point of interconnection. Further, the system includes a control unit operatively coupled to the bulk grid and the at least one micro-grid, where the control unit is configured to determine one or more bulk grid side parameters and one or more micro-grid side parameters, compare the one or more micro-grid side parameters with corresponding one or more bulk grid side parameters, synchronize each of the plurality of generating units with the bulk grid based on the comparison, and connect simultaneously each of the plurality of generating units to the bulk grid based on the synchronization.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "controlling unit" may include either a single component or a plurality of components, which are either active and/or passive and are connected or otherwise coupled together to provide the described function. Also, the term operatively coupled as used herein includes wired coupling, wireless coupling, electrical coupling, magnetic coupling, radio communication, software based communication, or combinations thereof.

As will be described in detail hereinafter, various embodiments of an exemplary method and system for connecting a smaller grid to a bulk grid are presented. Specifically, systems and methods for synchronizing and connecting a smaller grid to a bulk grid are presented. The smaller grid may be a micro-grid or a portion of the bulk grid that has been disconnected from the bulk grid due to an electrical disturbance, for instance. Use of the systems and methods presented hereinafter aids in preventing any adverse impacts to the generating assets of the micro-grid and/or the smaller grids while reconnecting the generating assets of the micro-grid to the bulk grid.

Figure 1:
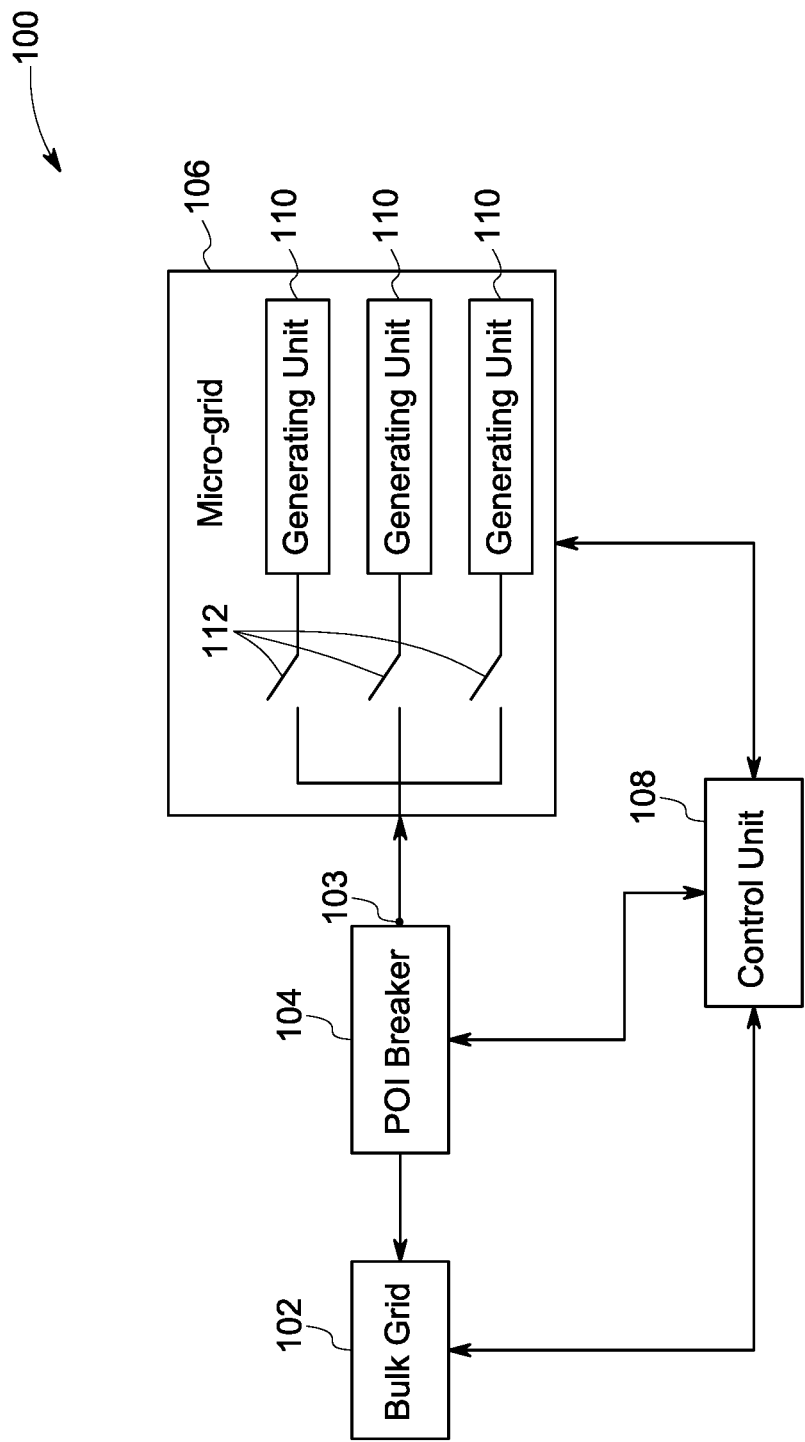
FIG. 1 is a diagrammatical representation of a system for synchronizing and reconnecting a micro-grid to a bulk grid, according to aspects of the present specification.

Turning now to the drawings and by way of example in FIG. 1, a diagrammatical representation 100 of a system for connecting a micro-grid to a bulk grid, according to aspects of the present specification, is presented. In a presently contemplated configuration, the system 100 includes a bulk grid 102, a point of interconnection (POI) breaker 104, a micro-grid 106, and a control unit 108. In one embodiment, reference numeral 103 may be representative of the point of interconnection (POI). The POI 103 is generally representative of the point at which the micro-grid 106 is operatively coupled to bulk grid 102. The POI breaker 104 may be disposed at or about the POI 103. In one embodiment, the bulk grid 102 may be an area main electrical grid that includes a plurality of smaller grids. Although the example of FIG. 1 represents a single micro-grid coupled to a bulk grid, a system having a plurality of micro-grids coupled to the bulk grid is also anticipated.

The term 'micro-grid,' as used herein, is used to refer to a small-scale power grid with its own power resources, generators, loads, and definable boundaries that are capable of operating independently or in conjunction with the bulk grid 102. In certain situations, it may be desirable to disconnect the micro-grid 106 from the bulk grid 102. Some examples of such situations include electrical disturbances in the bulk grid 102, outage of the bulk grid 102, and the like.

Further, the micro-grid 106 may include a plurality of generating units 110. The generating units 110 may in turn include a plurality of electrical generators configured to generate electrical energy. Furthermore, the generating units 110 are coupled to a plurality of loads. In one example, the generating unit 110 includes a synchronous generator and a non-synchronous generator. Also, each of the plurality of generating units 110 has a corresponding switch 112. When all the switches 112 are in a closed condition, the plurality of generating units 110 behaves as a single unit. Furthermore, when all the switches 112 are in the closed condition, the plurality of generating units 110 forms a micro-grid 106.

It may be noted that the micro-grid 106 may be coupled to the bulk grid 102 or may be disconnected from the bulk grid 102 at time $t_1$. In the example where at time $t_1$ the micro-grid 106 is coupled to the bulk grid 102, it may be desirable to disconnect the micro-grid 106 from the bulk grid 102 at time $t_1+\Delta t$ due to occurrence of certain electrical disturbances. In such a scenario, it may be desirable to reconnect the micro-grid 106 to the bulk grid 102 at time $t_2$, where $t_2>t_1+\Delta t$. In accordance with aspects of the present specification, system 100 facilitates resynchronization and simultaneous reconnection of each of the plurality of generating units 110 of the micro-grid 106 to the bulk grid 102.

In one embodiment, the micro-grid 106 may be reconnected to the bulk grid 102 in real-time. In particular, the micro-grid 106 may be reconnected to the bulk grid 102 when the generating units 110 of the micro-grid 106 are operational and providing power to the loads. Implementing the system 100 as described hereinabove advantageously allows the micro-grid 106 to be reconnected to the bulk grid 102 without the need for shutting down the bulk grid 102 and/or any other micro-grid coupled to the bulk grid 102.

In situations where the micro-grid 106 is disconnected from the bulk grid 102, the micro-grid 106 is configured to operate independent of the bulk grid 102. In this scenario, micro-grid side parameters, such as a frequency, a phase, and a voltage corresponding to the micro-grid 106 are determined based on the operating condition of the micro-grid 106. Additionally, bulk grid side parameters such as a frequency, a phase, and a voltage corresponding to the bulk grid 102 may be determined. It may be noted that in certain scenarios, the parameters corresponding to the bulk grid 102 and the micro-grid 106 may also be determined when the micro-grid 106 and bulk grid 102 are connected to each other.

In one example, when the micro-grid 106 is decoupled from the bulk grid 102 at a given instance of time $t_3$, where $t_2>t_3>t_1+\Delta t$, one or more of bulk grid side parameters are different from the one or more micro-grid side parameters. In particular, voltage values, phase values, and/or frequency values corresponding to the micro-grid 106 are different from those corresponding to the bulk grid 102.

In one example, at time instance $t_3$, the frequency of the micro-grid 106 is $f_1$, while the frequency corresponding to the bulk grid 102 is $f_2$, where $f_1$ is different from $f_2$. However, while reconnecting the micro-grid 106 to the bulk grid 102 at say time $t_2$, it is desirable to ensure that the frequency $f_1$ corresponding to the micro-grid 106 is substantially equal to the frequency $f_2$ corresponding to the bulk grid 102. More particularly, it is desirable to minimize the difference between the frequencies $f_1$ and $f_2$ that respectively correspond to the micro-grid 106 and the bulk grid 102 such that the difference is an optimal value. In one example, the optimal value of difference between frequencies of the micro-grid 106 and the bulk grid 102 may be about 0.01 Hz. Similarly, while reconnecting the micro-grid 106 to the bulk grid 102, it is also desirable to achieve an optimal value of a difference in voltage values and/or phase values corresponding to the micro-grid 106 and the bulk grid 102. The scenario where the micro-grid side parameters are substantially equal to the corresponding bulk grid side parameters is representative of a synchronized state of the micro-grid 106 with respect to the bulk grid 102.

In accordance with aspects of the present specification, the difference between the frequencies corresponding to the micro-grid 106 and the bulk grid 102 may be reduced by modifying/altering one or more input parameters corresponding to the generating units 110 of the micro-grid 106 to synchronize or resynchronize the micro-grid 106 with the bulk grid 102 prior to reconnecting the micro-grid 106 to the bulk grid 102. In the example of FIG. 1, the control unit 108 may be configured to modify the one or more input parameters corresponding to the generating units 110. Some examples of the input parameters may include a mechanical speed, a field, a torque, and an excitation current when the generating unit 110 is an electrical generator.

In one embodiment, the control unit 108 may be an analog controller or a digital controller. In another embodiment, the control unit 108 may be proportional-integral (PI) controller. In yet another embodiment, the control unit 108 may include one or more processing units and associated memory devices configured to execute at least one control algorithm. As used herein, the term "processing unit" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements. Control steps that may be executed by the control unit 108 will be described in greater detail with respect to FIG. 2.

Implementing the system 100 as described hereinabove aids in synchronizing the micro-grid 106 with the bulk grid 102 prior to reconnecting the micro-grid 106 to the bulk grid 102. In particular, implementing the system 100 as described hereinabove, allows the generating units 110 of the micro-grid 106 to be simultaneously connected to the bulk grid 102. The exemplary method of synchronization and connection of the micro-grid 106 with the bulk grid 102 will be explained in greater detail with respect to FIG. 2.

Figure 2:
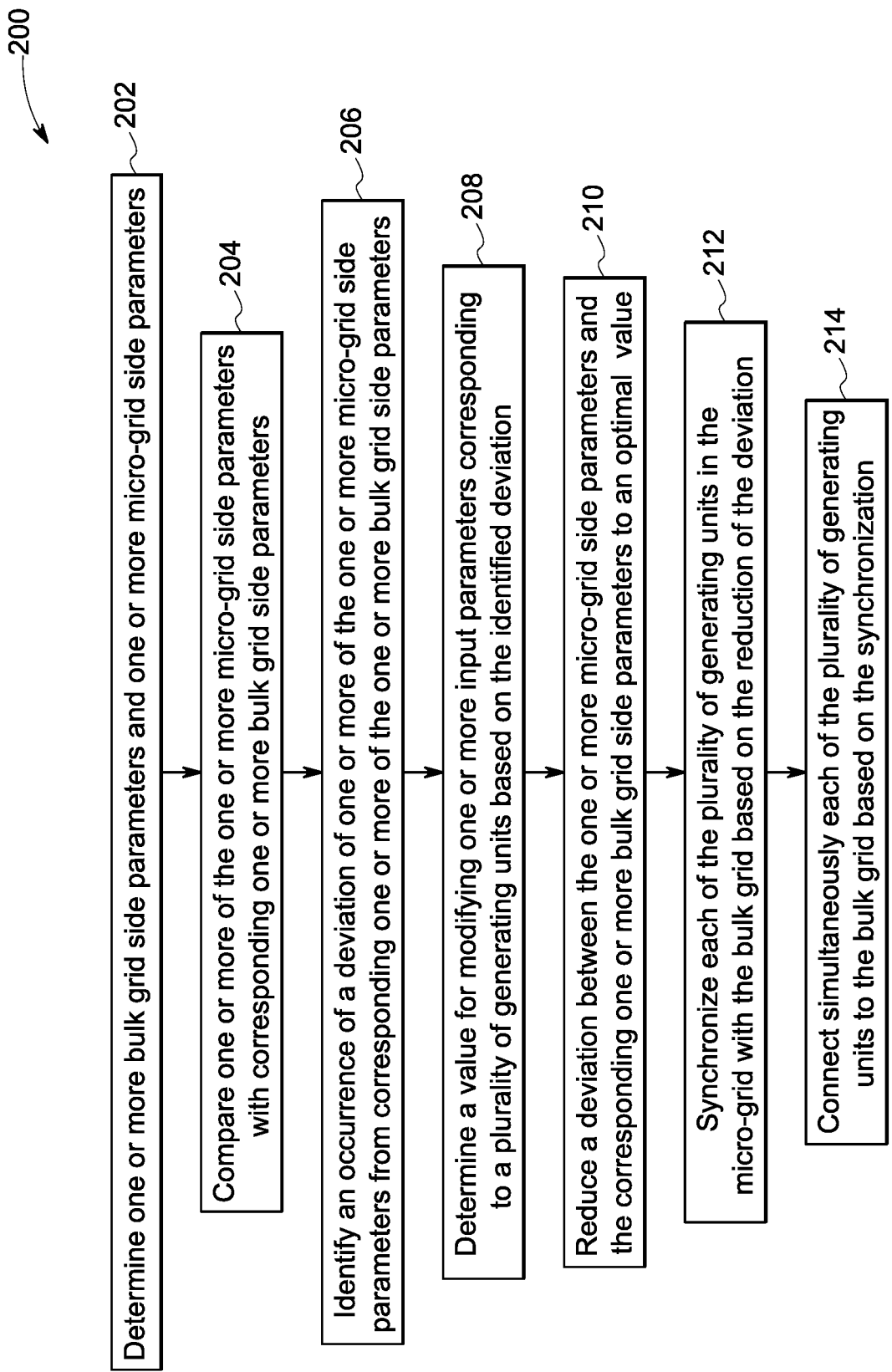
FIG. 2 is a flow chart representing an exemplary method for synchronizing and connecting a micro-grid to a bulk grid, according to aspects of the present specification.

FIG. 2 is a flow chart 200 representing an exemplary method for synchronizing and connecting a micro-grid to a bulk grid, according to aspects of the present specification. In the example of FIG. 2, a method for resynchronizing and reconnecting the micro-grid to the bulk grid is presented. The method of FIG. 2 will be described with respect to the elements of FIG. 1.

As previously noted, certain scenarios call for the micro-grid to be disconnected from the bulk grid, during which time the micro-grid operates in an independent mode. Subsequently, it may be desirable to reconnect the micro-grid to the bulk grid and hence, it may be desirable to resynchronize the micro-grid with the bulk grid. The term resynchronization is used to refer to the synchronization of the micro-grid 106 with the bulk grid prior to coupling the micro-grid to the bulk grid.

The method begins at block 202, where one or more bulk grid side parameters and one or more micro-grid side parameters are determined. It may be noted that at step 202 the bulk grid side parameters and micro-grid side parameters are determined when the micro-grid 106 is decoupled from the bulk grid 102. The bulk grid side parameters and the micro-grid side parameters include a voltage, a frequency, a phase angle, or combinations thereof. The term 'bulk grid side,' as used herein, refers to a point between the bulk grid 102 and the POI breaker 104. Similarly, the term 'micro-grid side,' as used herein, refers to a point between the micro-grid 106 and the POI breaker 104. In one example, the bulk grid side parameters and the micro-grid side parameters are determined at the same instant of time. In particular, the bulk grid side parameters and the micro-grid side parameters are determined simultaneously.

Moreover, in certain embodiments, the bulk grid side parameters and the micro-grid side parameters are determined using the control unit 108. In another embodiment, the bulk grid side parameters and the micro-grid side parameters are determined using a voltage sensing device, a frequency determination device, a phase angle determination device, or combinations thereof. It may be noted that in certain examples, the one or more bulk grid side parameters and one or more micro-grid side parameters may also be determined when the micro-grid 106 is coupled to the bulk grid 102.

Further, at block 204, one or more of the micro-grid side parameters are compared with corresponding one or more of the bulk grid side parameters to identify an occurrence of a deviation of one or more parameters corresponding to the micro-grid side from corresponding parameters of the bulk grid side. In one example, the voltage corresponding to the micro-grid side is compared with the voltage corresponding to the bulk grid side. Similarly, the phase angle corresponding to the micro-grid side is compared with the phase angle corresponding to the bulk grid side. In a similar manner, the frequency corresponding to the micro-grid side is compared with the frequency corresponding to the bulk grid side.

In certain scenarios, based on the comparison at block 204, no deviation between the micro-grid side parameters and the bulk grid side parameters may be identified. In this scenario, the micro-grid 106 is in a synchronized or resynchronized state with reference to the bulk grid 102. In particular, when the voltage, frequency, and phase angle on the micro-grid side is substantially equal to the voltage, frequency, and phase angle on the bulk grid side, the micro-grid 106 is in a resynchronized state or resynchronized with the bulk grid 102. In such a situation, control may be passed to block 214, where the micro-grid 106 is instantly reconnected to the bulk grid 102. More particularly, each of the plurality of generating units 110 of the micro-grid 106 is simultaneously reconnected to the bulk grid 102.

However, in certain other scenarios, based on the comparison of block 204, an occurrence of a deviation of one or more of the micro-grid side parameters from the corresponding one or more of the bulk grid side parameters may be identified, as indicated by block 206. In particular, if a value of one or more micro-grid side parameters is different from corresponding one or more bulk grid side parameters, a deviation is identified. In this situation, it is desirable to reduce/minimize any deviation of the micro-grid side parameters from the corresponding bulk grid side parameters prior to reconnecting the generating units 110 of the micro-grid 106 to the bulk grid 102.

In accordance with aspects of the present specification, the deviating micro-grid parameters are resynchronized with corresponding bulk grid side parameters prior to reconnecting the generating units 110 of the micro-grid 106 to the bulk grid 102. In one embodiment, the deviating micro-grid parameters may be resynchronized with corresponding bulk grid side parameters by modifying values of one or more input parameters corresponding to one or more generating units 110 of the micro-grid 106. As previously noted, some examples of the input parameters include a mechanical speed, a field, a torque, an excitation current, a reactive power and an active power.

Accordingly, at block 208, a desired value for modifying one or more input parameters corresponding to the plurality of generating units 110 of the micro-grid 106 may be determined based on the deviation determined at block 206. In particular, the value for modifying the one or more input parameters corresponding to the generating units 110 of the micro-grid 106 to resynchronize the deviating micro-grid side parameters to the corresponding bulk grid side parameters may be determined at block 208.

In one embodiment, the control unit 108 is employed to determine the values for modifying the input parameters of the generating units 110 to facilitate resynchronization of the micro-grid 106 with the bulk grid 102 prior to reconnecting micro-grid 106 to the bulk grid 102. Accordingly, the deviation(s) determined at block 206 may be provided as an input to the control unit 108. The control unit 108 is configured to determine the values for modifying the input parameters based on the determined deviation. By way of example, if the generating unit 110 is an electrical generator or an alternator, values for modifying input parameters such as a mechanical speed, a field, a torque, and/or an excitation current may be determined.

Subsequent to the determination of values for modifying the one or more input parameters corresponding to the generating units 110, the control unit 108 may be configured to reduce/minimize the determined deviation between one or more micro-grid side parameters and the corresponding one or more bulk grid side parameters to an optimal value, as indicated by block 210. In certain embodiments, the optimal value may be zero. The computation of the values for modifying the input parameters based on the determined deviation(s) of block 208 and the subsequent modification of the input parameters based on the determined values of block 210 will be described with reference to FIG. 3.

Figure 3:
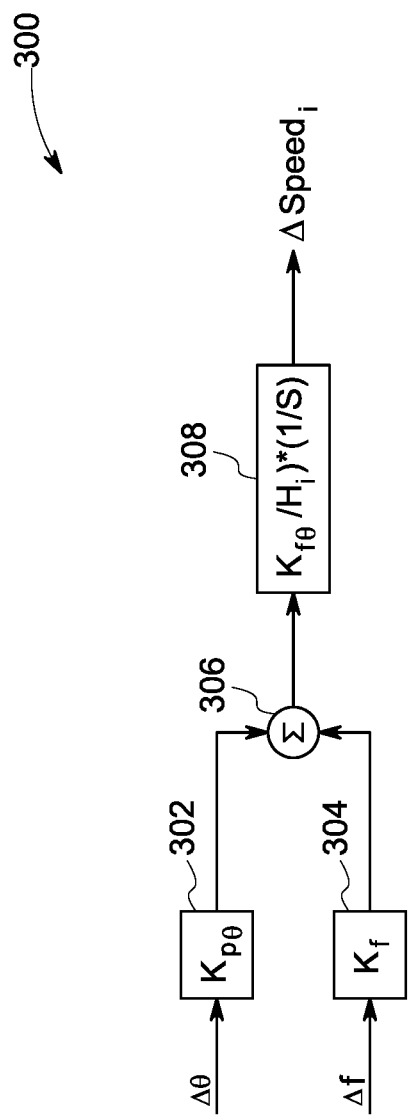
FIG. 3 is a control unit for use in the system of FIG. 1, according to aspects of the present specification.

Referring now to FIG. 3, one example of a control unit 300 for use in the system of FIG. 1, according to aspects of the present specification is presented. FIG. 3 is described with reference to the components of FIGS. 1-2.

In the example of FIG. 3, the control unit 300 is a proportional integral (PI) controller. Also, the control unit 300 includes proportional subunits 302, 304 and a summing subunit 306. The proportional subunits 302, 304 may be configured to modify any input provided to the proportional subunits 302, 304 by multiplying the input by a constant value. In one example, the input includes a value of bulk grid side and micro-grid side parameters acquired from simultaneous measurements. The summing subunit 306 may be configured to add at least two values that are provided as inputs to the summing subunit 306 from the proportional subunits 302, 304. In addition, the control unit 300 includes an integral subunit 308. The integral subunit 308 is configured to generate an integral value of any input quantity provided to the integral subunit 308 by integrating the input quantity over a period of time.

As previously noted, the control unit 300 is configured to determine value(s) for modifying the input parameters corresponding to the generating units 110 to resynchronize the micro-grid 106 with the bulk grid based on the deviation(s) of the micro-grid side parameters from the corresponding bulk grid side parameters. Also, the micro-grid side parameters and the bulk grid side parameters include a frequency, a voltage, and/or a phase angle.

In the example of FIG. 3, a deviation in frequency $\Delta f$ and a deviation in phase angle $\Delta \theta$ are provided as inputs to the proportional subunits 302, 304. These inputs are employed to determine a value for modifying an input parameter such as speed corresponding to a plurality of generating units of the micro-grid 106. Accordingly, in one embodiment, if a deviation in phase angle $\Delta \theta$ between the micro-grid side and the bulk grid side is identified at block 206, this deviation $\Delta \theta$ is provided as an input to the proportional subunit 302. Similarly, if a deviation in frequency $\Delta f$ between the micro-grid side and the bulk grid side is identified at block 206, this deviation in frequency $\Delta f$ is provided as an input to the proportional subunit 304.

In the example of FIG. 3, $K_{p\theta}$ is a proportional gain constant term corresponding to a phase angle deviation. In particular, $K_{p\theta}$ is the proportional gain constant that is associated with the proportional subunit 302. Furthermore, the deviation in phase angle $\Delta \theta$ that is input to the proportional subunit 302 may be multiplied by the proportional gain $K_{p\theta}$. Accordingly, the subunit 302 produces an output value that is proportional to the deviation in phase angle $\Delta \theta$. The value of $K_{p\theta}$ may change with the configuration of the micro-grid 106 such as the number of generating units 110 in the micro-grid 106.

Similarly, $K_f$ is a proportional gain constant corresponding to a frequency deviation. In particular, $K_f$ is the proportional gain constant that is associated with the proportional subunit 304. The deviation in phase angle $\Delta f$ that is provided as an input to the proportional subunit 304 is multiplied by the proportional gain constant $K_f$. The proportional subunit 304 produces an output value that is proportional to the deviation in frequency $\Delta f$. Further, output values from the proportional subunits 302, 304 are summed using the summing subunit 306.

Moreover, an output from the summing subunit 306 is provided to the integral subunit 308. The output provided from the summing subunit 306 is representative of an error signal. It may be noted that $K_{f\theta}$ is an integral gain corresponding to integral subunit 308. The integral gain $K_{f\theta}$ is inversely weighted by machine inertia $H_i$, where i=1 to n and is representative of the number of generating units 110. At the integral subunit 308, the output from the summing unit 306 is processed to obtain the speed variation $\Delta \text{Speed}_i$, where i=1 to n, and n is representative of the number of generating units 110.

Further, in the example of FIG. 3, corresponding values for modifying the speed $\Delta \text{Speed}_i$ may be provided to each of the plurality of generating units 110. Upon receiving the determined values for modifying the speed, each generating unit 110 may vary the speed accordingly. This variation/modification of the speed by each generating unit 110 aids in minimizing/reducing the deviation in the voltage, the frequency, and/or the phase angle between the micro-grid 106 and the bulk grid 102.

Particularly, modifying the input parameters of each generating unit 110, such as speed, results in a change in the voltage, frequency, and/or phase angle of an electrical signal generated by that generating unit 110. This change in voltage, frequency, and phase angle of the electrical signal generated by individual generating units 110 results in a change in the values of the overall micro-grid side parameters, such as the voltage, frequency, and phase angle of the micro-grid 106. Further, this change in overall micro-grid side parameters in turn causes the deviation between the micro-grid side parameters and the bulk grid side parameters to reduce to an optimal value, such as zero. Also, this reduction in the deviation of the voltage, frequency, and/or phase angle facilitates resynchronization of the micro-grid 106 with the bulk grid 102.

The example of FIG. 3 presents a control unit 300 configured to determine the value for varying speed corresponding to the plurality of generating units 110. In a similar manner, control unit 300 is configured to determine values for modifying other input parameters corresponding to the generating units 110 to minimize other deviations of one or more micro-grid side parameters, such as voltage. In one example, the input parameter may include an excitation current of a field winding. Accordingly, a value for modifying the excitation current of a field winding of each of the generating units 110 is determined by a control unit 300. Subsequently, the excitation current of the field winding of the generating units 110 may be modified to minimize a deviation in the value of voltage between the micro-grid 106 and the bulk grid 102 and resynchronize the micro-grid 106 with the bulk grid 102.

In addition, the control unit 300 may be configured to achieve a combination of objectives such as minimizing overshoot, minimizing steady state error, reducing time for synchronization, and the like. Minimizing overshoot aids in reducing any excess torque stress in a shaft of the generating units 110. Furthermore, minimizing steady state error aids in enhanced synchronization of the micro-grid 106 having the plurality of generating units 110 with the bulk grid 102 prior to re-connection. Accordingly, electrical transients generated when the micro-grid 106 is re-connected with the bulk grid 102 is reduced. Moreover, for achieving the combination of objectives, the control unit 300 may be tuned on-line. The online tuning of the control unit 300 may accordingly cause a change in the value of the constants $K_{p\theta}$, $K_{f}$ and $K_{f\theta}$ corresponding to proportional subunits 302, 304, and the integral subunit 308, respectively. Furthermore, the control unit 300 is configured to adapt to any change in the configuration of generating units 110 in the micro-grid 106. Since the control unit 300 is configured to adapt to any change in configuration of the generating units 110 such as the change in number of generating units, any manual intervention for effective control operation using the control unit 300 is reduced considerably.

With returning reference to FIG. 2, the deviation between one or more micro-grid side parameters and the corresponding one or more bulk grid side parameters is minimized to the optimal value, as depicted by block 210. Modifying the input parameters of the generating units 110 at block 210 based on the values determined at block 208 aids in reducing the deviation between one or more micro-grid side parameters and the corresponding one or more bulk grid side parameters.

Furthermore, at block 212, each of the plurality of generating units 110 of the micro-grid 106 is resynchronized with the bulk grid 102 based on the reduction of the deviation between the one or more micro-grid side parameters and the corresponding one or more bulk grid side parameters. As noted hereinabove, this deviation may be reduced such that an optimal value of the difference is achieved. The deviation between the one or more micro-grid side parameters and the corresponding one or more bulk grid side parameters having a zero value is representative of a resynchronized state of the micro-grid 106 with respect to the bulk grid 102.

Once the micro-grid 106 is synchronized/resynchronized with the bulk grid 102, each of the plurality of generating units 110 is simultaneously reconnected to the bulk grid 102, as indicated by block 214. In one example, the simultaneous reconnection of each of the generating units 110 may include simultaneous closing of the corresponding switches 112 and the POI breaker 104. It may be noted that the POI breaker 104 has a first state and a second state, where the second state is different from the first state. In one example, the first state of the POI breaker 104 is an open state and the second state of the POI breaker 104 is a closed state. To effect the reconnection of the micro-grid 106 to the bulk grid 102, the control unit 108 is configured to transition the POI breaker 104 from the first state to the second state to operatively couple the plurality of generating units 110 of the micro-grid 106 to the bulk grid 102.

In one example, each of the plurality of generating units 110 is simultaneously reconnected to the bulk grid 102 in real-time. In particular, each of the plurality of generating units 110 is simultaneously reconnected to the bulk grid 102 without having to shut down the bulk grid 102 or any other micro-grid 106 connected to the bulk grid 102. Consequent to the simultaneous reconnection of the generating units 110 to the bulk grid 102, the micro-grid 106 is reconnected to the bulk grid 102. Although the method 200 is described with respect to resynchronization and reconnection of a single micro-grid to a bulk grid, a method for the resynchronization and reconnection of a plurality of micro-grids to the bulk grid is also envisaged.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

Various embodiments of systems and methods for interconnecting two grids, and more specifically systems and methods for resynchronizing and reconnecting a micro-grid to a bulk grid are presented. In particular, the systems and methods presented herein allow a plurality of generating units corresponding to a micro-grid to be simultaneously reconnected to the bulk grid. The resynchronizing of the micro-grid with the bulk grid aids in avoiding any adverse impact to the generating units in the micro-grid. Furthermore, simultaneously reconnecting multiple generating units of the micro-grid to the bulk grid simplifies the process of reconnecting the micro-grid to the bulk grid. Also, simultaneous reconnection of multiple generating units aids in reducing the amount of time and the number of intermediate steps for resynchonization and reconnection of the micro-grid to the bulk grid. The methods and systems for resynchronizing and reconnecting the micro-grid to the bulk grid may also find application in resynchronizing and reconnecting any smaller grid to a bulk grid.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A method for operatively coupling a plurality of generating units in at least one micro-grid to a bulk grid, wherein the at least one micro-grid is configurable to be operatively coupled to the bulk grid at a point of interconnection via a point of interconnection breaker, the method comprising:
   determining, using a control unit, one or more bulk grid side parameters and one or more micro-grid side parameters, wherein the control unit is operatively coupled to the at least one micro-grid and the bulk grid, and wherein the one or more bulk grid side parameters and the one or more micro-grid side parameters comprise at least one of a voltage, a frequency, and a phase angle;
   comparing, using the control unit, one or more of the one or more micro-grid side parameters with corresponding one or more bulk grid side parameters, wherein comparing the one or more micro-grid side parameters to the one or more bulk grid side parameters comprises identifying an occurrence of a deviation of one or more of the one or more micro-grid side parameters from corresponding one or more of the one or more bulk grid side parameters;
   determining, using the control unit, for each of the plurality of generating units, a deviation in frequency and a deviation in phase angle between the bulk grid side parameters and the micro grid side parameters for the generating unit;
   determining, using the control unit, for each of the plurality of generating units, a speed variation for the generating unit based on the deviation in phase angle and the deviation in frequency for the generating unit, wherein determining the speed variation for each of the plurality of generating units comprises:
   multiplying, using a first proportional subunit, the deviation in phase angle for the generating unit by a first proportional gain constant to generate a first proportional output value;
   multiplying, using a second proportional subunit, the deviation in frequency for the generating unit by a second proportional gain constant to generate a second proportional output value;
   summing, using a summing subunit, the first proportional output value and the second proportional output value to generate an error signal; and
   integrating, using an integral subunit, the error signal to generate the speed variation for the generating unit;
   synchronizing, using the control unit, each of the plurality of generating units in the at least one micro-grid with the bulk grid by modifying a speed of each of the plurality of generating units by the associated determined speed variation; and
   connecting simultaneously, using the point of interconnection breaker, each of the plurality of generating units to the bulk grid based on the synchronization, wherein connecting simultaneously comprises coupling each of the plurality of generating units to the bulk grid in real-time, and wherein coupling in real-time comprises coupling when the plurality of generating units of the micro-grid are operational and providing power to loads.

2. The method of claim 1, wherein connecting simultaneously each of the plurality of generating units to the bulk grid comprises transitioning the point of interconnection breaker from a first state to a second state to operatively couple the plurality of generating units to the bulk grid, and wherein the second state is different from the first state.

3. The method of claim 2, wherein the first state of the point of interconnection breaker comprises an open state, and wherein the second state of the point of interconnection breaker comprises a closed state.

4. The method of claim 1, wherein the one or more input parameters comprise at least one of a mechanical speed, a field, a torque, an excitation current, or combinations thereof.

5. The method of claim 1, wherein synchronizing each of the plurality of generating units with the bulk grid comprises reducing the deviation between the one or more of the one or more micro-grid side parameters and the corresponding one or more of the one or more bulk grid side parameters to an optimal value.

6. The method of claim 5, wherein the optimal value comprises a zero value.

7. A system for operatively coupling a plurality of generating units in at least one micro-grid to a bulk grid, comprising:
   a point of interconnection breaker disposed between the bulk grid and the at least one micro-grid, wherein the point of interconnection breaker is configured to operatively couple the at least one micro-grid to the bulk grid at a point of interconnection;
   a control unit operatively coupled to the bulk grid and the at least one micro-grid, wherein the control unit is configured to:
   determine one or more bulk grid side parameters and one or more micro-grid side parameters, wherein the one or more bulk grid side parameters and the one or more micro-grid side parameters comprise at least one of a voltage, a frequency, and a phase angle;
   compare the one or more micro-grid side parameters with corresponding one or more bulk grid side parameters;
   identify an occurrence of a deviation of one or more of the one or more micro-grid side parameters from corresponding one or more of the one or more bulk grid side parameters;
   determine, for each of the plurality of generating units, a deviation in frequency and a deviation in phase angle between the bulk grid side parameters and the micro grid side parameters of for the generating unit;
   determine, using the control unit, for each of the plurality of generating units, a speed variation for the generating unit based on the deviation in phase angle and the deviation in frequency for the generating unit, wherein to determine the speed variation for each of the plurality of generating units, the control unit is configured to:
   multiply, using a first proportional subunit, the deviation in phase angle for the generating unit by a first proportional gain constant to generate a first proportional output value;
   multiply, using a second proportional subunit, the deviation in frequency for the generating unit by a second proportional gain constant to generate a second proportional output value;
   sum, using a summing subunit, the first proportional output value and the second proportional output value to generate an error signal; and
   integrate, using an integral subunit, the error signal to generate the speed variation for the generating unit;

synchronize each of the plurality of generating units with the bulk grid by modifying a speed of each of the plurality of generating units by the associated determined speed variation; and connect simultaneously each of the plurality of generating units to the bulk grid based on the synchronization such that each of the plurality of generating units is coupled to the bulk grid in real-time, when the plurality of generating units of the micro-grid are operational and providing power to loads.

8. The system of claim 7, wherein the plurality of generating units comprises a non-synchronous generator, a synchronous generator, or a combination thereof.

9. The system of claim 7, wherein the point of interconnection breaker has a first state and a second state, and wherein the second state is different from the first state.

10. The system of claim 9, wherein the control unit is further configured to transition the point of interconnection breaker from the first state to the second state to operatively couple the plurality of generating units of the at least one micro-grid to the bulk grid.

11. The system of claim 7, wherein the one or more input parameters comprise at least one of a mechanical speed, a field, a torque, an excitation current, or combinations thereof.

12. The system of claim 7, wherein the control unit comprises an analog controller, a digital controller, or a combination thereof.

13. A computer readable non-transitory medium comprising one or more tangible media, wherein the one or more tangible media comprise code for causing a computer to perform the steps of:

determining one or more bulk grid side parameters and one or more micro-grid side parameters, wherein a control unit is operatively coupled to at least one micro-grid and a bulk grid, and wherein the one or more bulk grid side parameters and the one or more micro-grid side parameters comprise at least one of a voltage, a frequency, and a phase angle;

comparing one or more of the one or more micro-grid side parameters with corresponding one or more bulk grid side parameters, wherein comparing the one or more micro-grid side parameters with the corresponding one or more bulk grid side parameters comprises identifying an occurrence of a deviation of one or more of the one or more micro-grid side parameters from corresponding one or more of the one or more bulk grid side parameters;

determining, for each of the plurality of generating units, a deviation in frequency and a deviation in phase angle between the bulk grid side parameters and the micro grid side parameters for the generating unit based on the comparing;

determining, for each of the plurality of generating units, a speed variation for the generating unit based on the deviation in phase angle and the deviation in frequency for the generating unit, wherein to determine the speed variation for each of the plurality of generating units, the code causes the computer to perform the steps of:

multiplying, using a first proportional subunit, the deviation in phase angle for the generating unit by a first proportional gain constant to generate a first proportional output value;

multiplying, using a second proportional subunit, the deviation in frequency for the generating unit by a second proportional gain constant to generate a second proportional output value;

summing, using a summing subunit, the first proportional output value and the second proportional output value to generate an error signal; and integrating, using an integral subunit, the error signal to generate the speed variation for the generating unit;

synchronizing each of a plurality of generating units in the at least one micro-grid with the bulk grid by modifying a speed of each of the plurality of generating units by the associated determined speed variation; and connecting simultaneously each of the plurality of generating units to the bulk grid based on the synchronization, wherein connecting simultaneously comprises coupling each of the plurality of generating units to the bulk grid in real-time, and wherein coupling in real-time comprises coupling when the plurality of generating units of the micro-grid are operational and providing power to loads.

14. The method of claim 1, wherein coupling in real-time further comprises reconnecting a micro-grid to the bulk grid without shutting down the bulk grid.

* * * * *